United States Patent
Eftekhari Roozbehani

(10) Patent No.: US 11,755,724 B2
(45) Date of Patent: Sep. 12, 2023

(54) SECURING SOFTWARE ROUTINES

(71) Applicant: IRDETO B.V., Hoofddorp (NL)

(72) Inventor: Yaser Eftekhari Roozbehani, Ottawa (CA)

(73) Assignee: Irdeto B.V., Hoofddorp (NL)

( * ) Notice: Subject to any disclaimer, the term of this patent is extended or adjusted under 35 U.S.C. 154(b) by 0 days.

(21) Appl. No.: 17/580,694

(22) Filed: Jan. 21, 2022

(65) Prior Publication Data

US 2022/0147618 A1    May 12, 2022

Related U.S. Application Data

(62) Division of application No. 16/545,925, filed on Aug. 20, 2019, now Pat. No. 11,263,316.

(51) Int. Cl.
*G06F 21/56* (2013.01)
*G06F 21/54* (2013.01)
(Continued)

(52) U.S. Cl.
CPC .............. *G06F 21/54* (2013.01); *G06F 21/12* (2013.01); *G06F 21/125* (2013.01);
(Continued)

(58) Field of Classification Search
CPC ........ G06F 21/125; G06F 21/60; G06F 21/62; G06F 21/6209; G06F 21/12;
(Continued)

(56) References Cited

U.S. PATENT DOCUMENTS 8,479,283 B2 * 7/2013 Wrighton ................ G06F 21/53
726/22
9,887,969 B1    2/2018 Shemesh et al.
(Continued)

FOREIGN PATENT DOCUMENTS

CA    2678953 A1 * 8/2008  ........... G06F 21/125
CA    2634812 C  * 3/2010  ......... G06F 12/1491
(Continued)

OTHER PUBLICATIONS

International Searching Authority, Invitation to Pay additional search fees for International Application No. PCT/EP2020/073226 dated Nov. 2, 2020.
(Continued)

*Primary Examiner* — Jayesh M Jhaveri
(74) *Attorney, Agent, or Firm* — Rimon PC; Marc S. Kaufman

(57) ABSTRACT

A method of securing a software routine implemented in a software instance executing in an execution environment, the method comprising: initializing a code block of the software instance with a reference to the software routine by storing the reference such that the stored reference is inaccessible to code outside of the code block; and returning a reference to the code block, the reference to the code block used by the software instance outside of the code block to invoke the software routine; wherein the code block is configured to: (a) invoke the software routine using the stored reference, and, (b) after a predetermined number of invocations of the software routine by the code block, modify the stored reference so as to prevent further invocation of the software routine by the code block.

18 Claims, 8 Drawing Sheets

(51) Int. Cl.
  *G06F 21/12* (2013.01)
  *G06F 21/14* (2013.01)
  *G06F 21/60* (2013.01)
  *G06F 21/62* (2013.01)
  *G06F 21/57* (2013.01)
  *H04L 9/08* (2006.01)

(52) U.S. Cl.
  CPC .......... *G06F 21/564* (2013.01); *G06F 21/566* (2013.01); *G06F 21/577* (2013.01); *G06F 21/121* (2013.01); *G06F 21/14* (2013.01); *G06F 21/60* (2013.01); *G06F 21/62* (2013.01); *G06F 21/6209* (2013.01); *H04L 9/088* (2013.01)

(58) Field of Classification Search
  CPC ........ G06F 21/121; G06F 21/14; G06F 21/54; G06F 21/56; G06F 21/564; G06F 21/566; G06F 21/57; G06F 21/577; H04L 9/088
  See application file for complete search history.

(56) References Cited

U.S. PATENT DOCUMENTS

| | | | | |
|---|---|---|---|---|
| 2008/0250054 A1* | 10/2008 | Nickel | .................. | G06F 16/217 707/999.102 |
| 2010/0125913 A1* | 5/2010 | Davenport | ............. | G06F 21/55 726/25 |
| 2012/0192283 A1* | 7/2012 | Gu | ......................... | H04L 9/002 726/26 |
| 2014/0026214 A1 | 1/2014 | Adams et al. | | |
| 2017/0154171 A1 | 6/2017 | Krten | | |
| 2019/0044971 A1 | 2/2019 | Sukhomlinov et al. | | |
| 2019/0087566 A1 | 3/2019 | Hosie | | |

FOREIGN PATENT DOCUMENTS

| | | | | |
|---|---|---|---|---|
| CA | 2870503 A1 * | 10/2013 | ............. | G06F 21/51 |
| FR | 2974207 A1 * | 10/2012 | ............. | G06F 21/14 |
| WO | WO-0244850 A2 * | 6/2002 | ............. | G06F 16/10 |

OTHER PUBLICATIONS

International Searching Authority, International Search Report and Written Opinion for International Application No. PCT/EP2020/073226 dated Dec. 23, 2020.

* cited by examiner

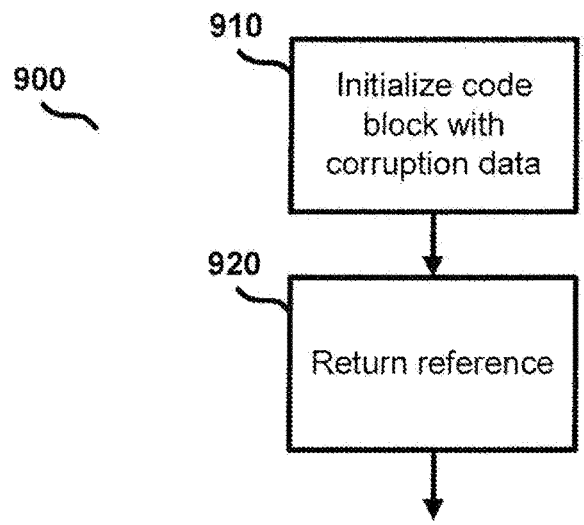
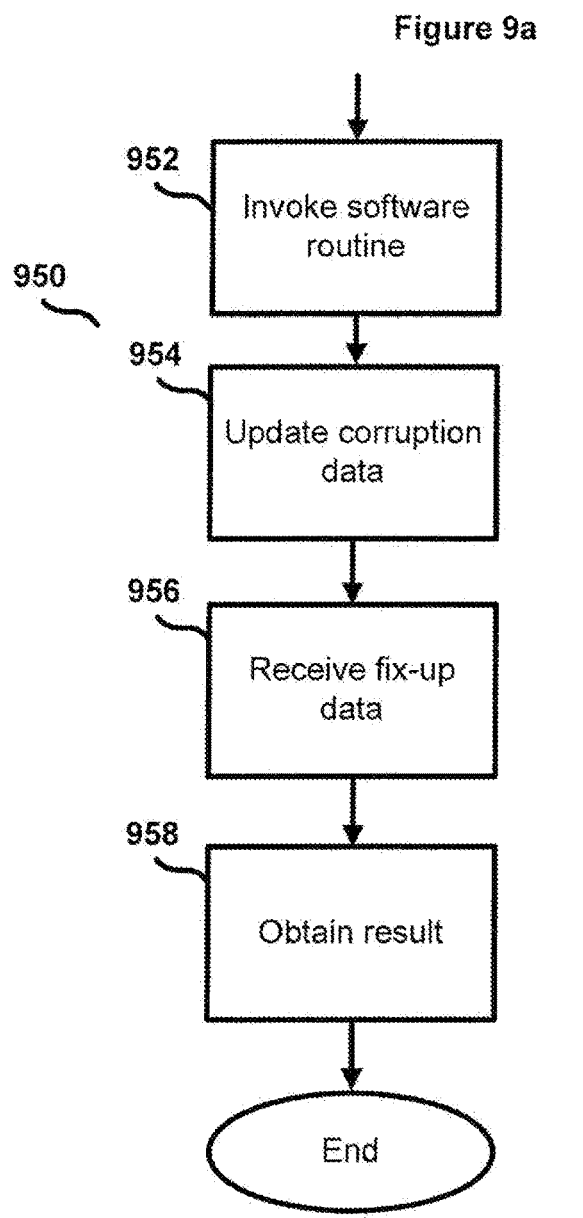
Figure 9a
Figure 9b

SECURING SOFTWARE ROUTINES

FIELD OF THE INVENTION

The present invention relates to methods of securing software routines, a method of executing such secured software routines, as well as corresponding apparatus and computer programs.

BACKGROUND OF THE INVENTION

Software applications often operate or execute in a hostile environment. Attacks may often be assumed to have a degree of control over the execution of an item of software. Indeed, attacks may often easily cause functions or routines in the item of software to be run multiple times. This can be done in order to reverse engineer routines—e.g. by mapping some or all of the possible inputs of a routine to some or all of the possible outputs. Additionally, or alternatively this may be done simply to enable additional functionality of the software, for which the attacker is not authorized, or acquire secret data used by or generated by such routines.

In particular, items of software run in browsers, or interpreters, may often be vulnerable to these sorts of re-running attacks. This is because the item of software is typically provided in the form of a high-level programming or scripting language and typically run in an execution environment (such as an interpreter) that provides for some debugging/interrogation of the code of the software, and its execution flow. Such attacks are also possible on compiled software running in a more traditional execution environment, for example through the use of debugging tools which offer similar functionality.

SUMMARY OF THE INVENTION

It is an object of the invention to address problems in the prior art such as those outlined above. In particular, it would be desirable to provide an improved method for protecting items of software against such rerun attacks.

According to a first aspect of the invention, there is provided a method of securing a software routine implemented in a software instance executing in an execution environment, the method comprising: initializing a code block of the software instance with a reference to the software routine by storing the reference such that the stored reference is inaccessible to code outside of the code block; and returning a reference to the code block, the reference to the code block used by the software instance outside of the code block to invoke the software routine; wherein the code block is configured to: (a) invoke the software routine using the stored reference, and, (b) after a predetermined number of invocations of the software routine by the code block, modify the stored reference so as to prevent further invocation of the software routine by the code block.

According to a second aspect of the invention, there is provided method of executing a software routine in a software instance executing in an execution environment, the method comprising: executing a code block of the software instance, said executing the code block comprising the code block: invoking the software routine using a reference to the software routine, the reference to the software routine stored as part of initialization of the code block such that the stored reference is inaccessible to code outside of the code block; and upon determining that the software routine has been invoked by the code block a predetermined number of times, modifying the stored reference so as to prevent further invocation of the software routine by the code block.

In the methods described above the execution environment may prevent access to the stored reference by code outside of the code block.

Storing the reference may comprise storing a memory address of the software routine in a pointer, and the step of modifying comprises modifying the memory address stored in the pointer.

Alternatively storing the reference may comprise storing the software routine as a function object in a function object variable, and the step of modifying comprises overwriting the function object stored in the function object variable.

The reference to the software routine may be stored by executing a further code block which, once executed, cannot be accessed by code outside the further code block, and wherein the code block is defined by the further code block.

According to a third aspect of the invention, there is provided method of securing a software routine implemented in a software instance executing in an execution environment, the method comprising: initializing a code block of the software instance by storing corruption data such that the stored corruption data is inaccessible to code outside of the code block; and returning a reference to the code block, the reference to the code block used by the software instance outside of the code block to invoke the software routine, wherein the code block is configured to: (i) invoke the software routine, said invocation comprising applying the stored corruption data to modify software routine data, and (ii) update the stored corruption data based on the invocation of the software routine, wherein the software instance is configured to: receive fix-up data corresponding to the stored corruption data, and obtain a result for the software routine by applying the fix-up data to software routine data to thereby compensate for said modification.

In some embodiments the step of initializing further comprises: storing a reference to the software routine such that the stored reference is inaccessible to code outside of the code block. The code block may be configured to invoke the software routine using the stored reference.

According to a fourth aspect of the invention, there is provided method of executing a software routine in a software instance executing in an execution environment, the method comprising: executing a code block of the software instance, said executing the code block of the software instance comprising the code block: (a) invoking the software routine, said invocation comprising applying stored corruption data to modify software routine data, wherein corruption data is stored as part of the initialization of the code block such that the stored corruption data is inaccessible to code outside of the code block, and (b) updating the stored corruption data based on the invocation of the software routine, receiving fix-up data corresponding to the stored corruption data; and obtaining a result for the software routine by applying the fix-up data to software routine data to thereby compensate for said modification.

In some embodiments the step of invoking the software routine uses a reference to the software routine, wherein the reference is stored as part of the initialization of the code block such that the stored reference is inaccessible to code outside of the code block.

In some embodiments of the method of the third or fourth aspect the software routine data may comprise data used by the software routine and/or data generated by the software routine In some embodiments of the method of the third or fourth aspect applying the stored corruption data to modify data for the software routine may comprise any one or more of: (a) applying the stored corruption data to one or more inputs of the software routine; (b) applying the stored corruption data to one or more outputs of the software routine; and (c) applying, as part of the software routine, the stored corruption data to intermediate data of the software routine.

In some embodiments of the method of the third or fourth aspect the step of obtaining the result of the software routine is part of said executing the code block.

In some embodiments of the method of the third or fourth aspect applying the fix-up data to data for the software routine comprises any one or more of: (a) applying the fix-up data to one or more inputs of the software routine; (b) applying the fix-up data to one or more outputs of the software routine; and (c) applying, as part of the software routine, the fix-up data to intermediate data of the software routine.

In some embodiments of the method of the third or fourth aspect the execution environment may prevent access to the stored corruption data by code outside of the code block.

In some embodiments of the method of the third or fourth aspect the corruption data may be stored by executing a further code block which, once executed, cannot be accessed by code outside the further code block, and wherein the code block is defined by the further code block.

Said further code block of the methods described previously may be an anonymous function. Additionally, said stored reference may form part of a closure of the further code block. Said stored corruption data may form part of a closure of the further code block.

In some embodiments the execution environment implements a boundary as part of the closure, thereby preventing code outside the further code block from interrogating the closure.

In any of the methods described previously the execution environment may comprise any of: (a) a JavaScript virtual machine and the software is implemented at least in part in JavaScript; (b) a Java virtual machine and the software is implemented at least in part in Java; (c) a LISP interpreter and the software is implemented at least in part in LISP; and (d) a Python interpreter and the software is implemented at least in part in Python.

According to a fourth aspect of the invention, there is provided a method of securing software, the method comprising: receiving software comprising at least one software routine; modifying said software such that, when executed as a software instance in a runtime environment, said software instance secures the at least one software routine by carrying out any of the methods as described previously.

According to a fifth aspect of the invention, there is provided an apparatus arranged to carry out a method according to any embodiment of the first to fourth aspects of the invention.

In particular, there may be provided a system comprising one or more processors and a memory coupled to the one or more processors which are configured to execute programmed instructions stored in the memory comprising the steps of any embodiment of the first to fourth aspects of the invention According to a sixth aspect of the invention, there is provided a computer program which, when executed by one or more processors, causes the one or more processors to carry out a method according to any embodiment of the first to fourth aspects of the invention. The computer program may be stored on a computer-readable medium. Said computer readable medium may be non-transitory.

BRIEF DESCRIPTION OF THE DRAWINGS

Embodiments of the invention will now be described, by way of example only, with reference to the accompanying drawings, in which:

FIG. 9a is a flowchart illustrating an example method carried out when running a protected item of software such as the protected item of software in FIG. 8; and FIG. 9b is a flowchart illustrating an example method carried out when running a protected item of software such as the protected item of software in FIG. 8.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
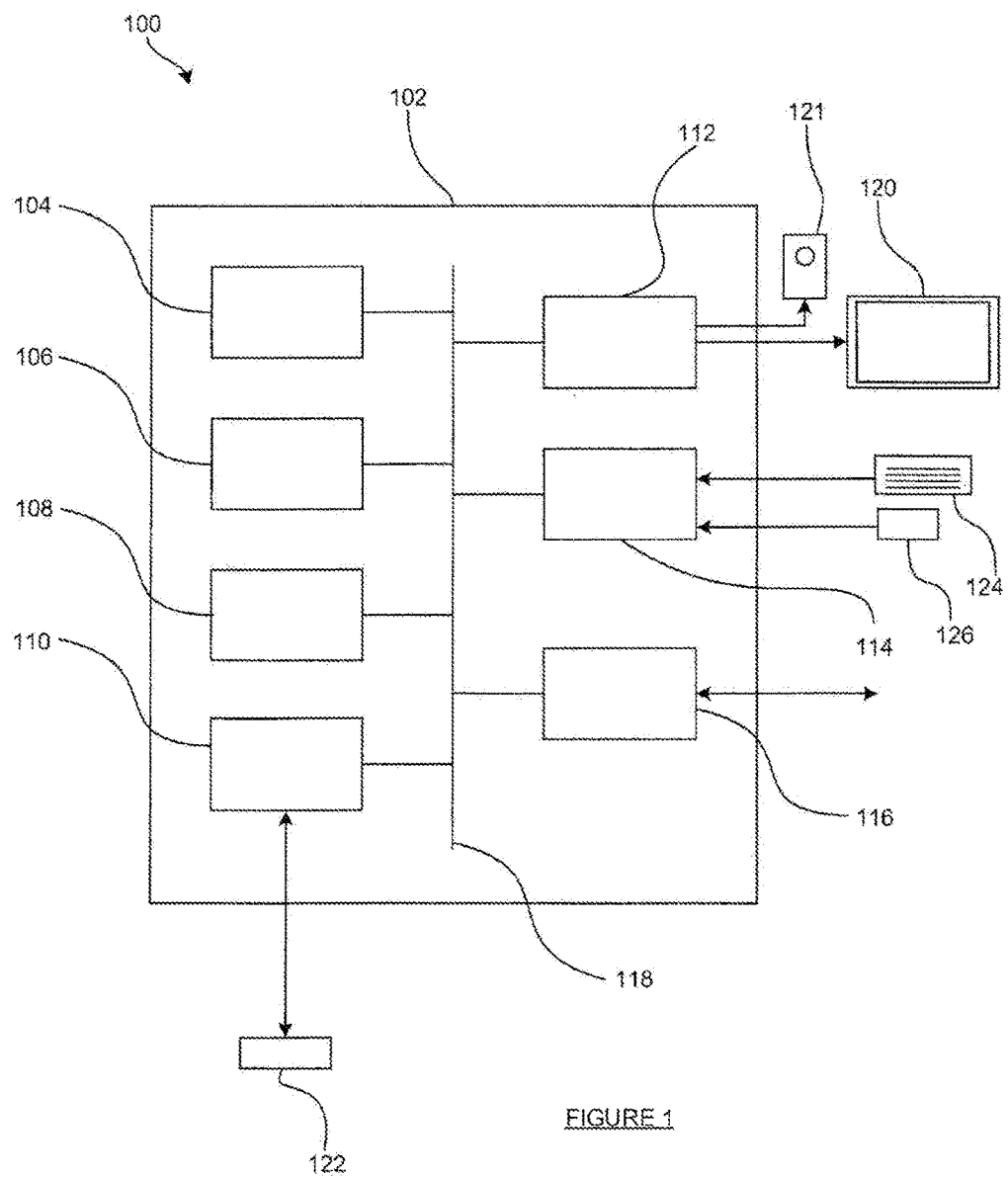
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, an optical disc, a solid-state-storage device, a ROM, etc. The storage medium 104 may store an operating system for the processor 108 to execute in order for the computer 102 to function. The storage medium 104 may also store one or more computer programs (or software).

The memory 106 may be any random access memory (storage unit or volatile storage medium) suitable for storing data and/or computer programs (or software).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

Figure 2:
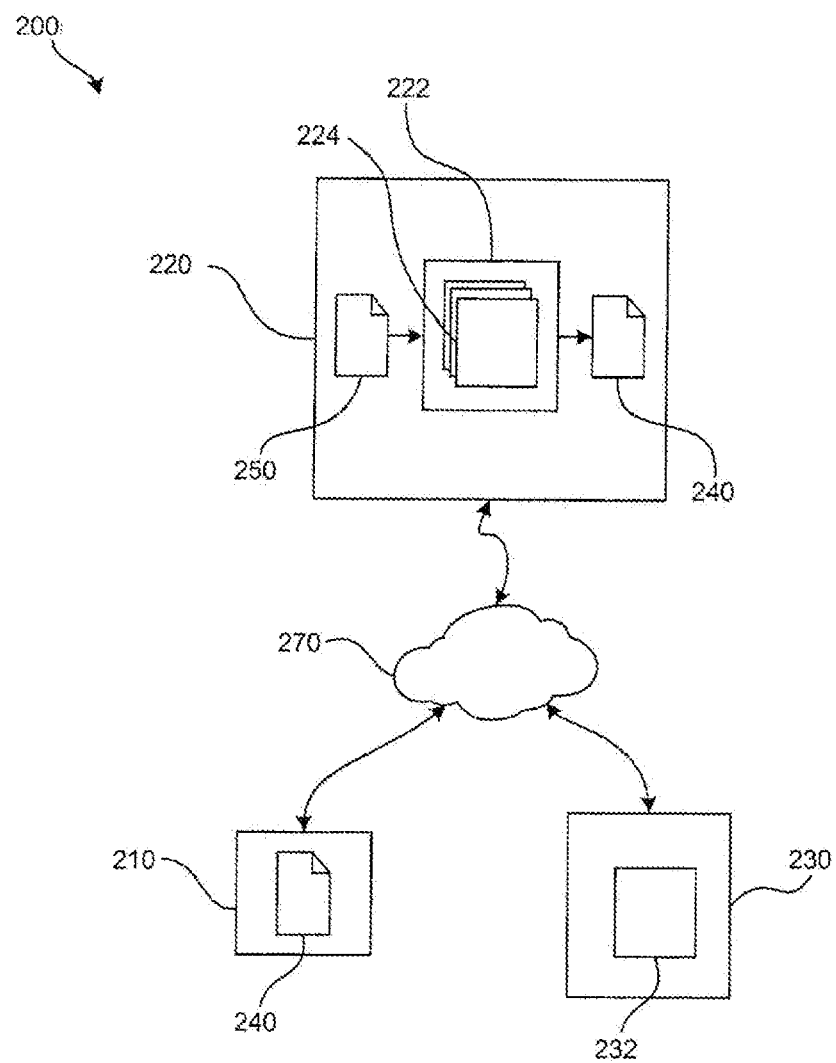
FIG. 2 schematically illustrates an example system according to an embodiment of the invention.

FIG. 2 schematically illustrates an example system 200 according to some embodiments of the invention. The system 200 comprises a computer system (or client system or user system) 210, a protection system 220, an optional enforcement system 230 and a network 270.

In summary, the computer system 210 is arranged to execute or process an item of software 240. The item of software 240 is a protected item of software—the nature of the "protection" that has been applied to the item of software 240 (or which the item of software 240 incorporates or uses) shall be described in more detail later. The protection system 220 is responsible for generating the protected item of software 240 based on an initial item of software 250. The optional enforcement system 230 may be used, during execution of the protected item of software 240, to enforce integrity of the protected item of software 240 (or at least to enforce integrity of some or all of the protected item of software 240). Such enforcing may include participation in (or helping with) one or more of the protections applied to the protected item of software 240. As shall become apparent, the system 200 enables protection of an initial item of software 250, so that the resulting protected item of software 240 may be executed on a computer system 210. Optionally this may also include the enforcement system 230 enforcing integrity of some or all of the protected item of software 240 during execution of the protected item of software 240 on the computer system 210.

The computer system 210, the protection system 220 and optionally the enforcement system 230 may be arranged to communicate with each other over, or via, the network 270. The network 270 may be any kind of network suitable for transmitting or communicating data from any one of the computer system 210, the protection system 220 and the enforcement system 230 to another one of the computer system 210, the protection system 220 and the enforcement system 230. For example, the network 270 could comprise one or more of: a local area network, a wide area network, a metropolitan area network, the internet, a wireless communications network, a cable network, a digital broadcast network, a satellite communication network, a telephone network, etc. The computer system 210, the protection system 220 and the enforcement system 230 may communicate over the network 270 via any suitable communication mechanism/protocol in order to communicate data with each other. However, it will be appreciated that other communication scenarios are possible.

Whilst FIG. 2 illustrates a single computer system 210, a single protection system 220 and a single enforcement system 230, it will be appreciated that there may be multiple computer systems 210 and/or multiple protection systems 220 and/or multiple enforcement systems 230 and that FIG. 2a has been simplified for ease of illustration.

The computer system 210, the protection system 220 and the enforcement system 230 may each be, or may each comprise, one or more computer systems 100 as described above with reference to FIG. 1. For example, the computer system 210 may be a personal computer, a server computer, a laptop, a mobile telephone, a tablet computer, a television, etc. Similarly, the protection system 220 and the enforcement system 230 may, for example, each comprise one or more server computers.

The protection system 220 and the enforcement system 230 may be operated by separate entities, or may be operated by the same entity. The protection system 220 and the enforcement system 230 may be physically separate from each other, or they may share one or more computer systems 100 (e.g. they may be implemented, at least in part, using one or more common servers).

An operator of the computer system 210 may be an attacker, in that the operator may wish to launch an attack against (or based on or using) an item of software executed on the computer system 210. For example: (a) the item of software may contain, or generate, secret information that the attacker wishes to obtain (such as one or more cryptographic keys, one or more secret keys, data of other users, etc.) via the attack; (b) the attacker may try to use the item of software (in a manner not initially intended or authorized by the creator of the item of software) to achieve functionality to which the attacker is not entitled or authorized, such as by circumventing or thwarting security checks; (c) the attacker may wish to achieve new/alternative functionality not originally intended with the item of software; (d) the attacker may wish to use the item of software to try to gain unauthorized access to functionality or data from one or more servers (e.g. a server hosting a website associated with a webpage providing or comprising the item of software); etc.

A so-called "white-box" attack environment is an attack model for the execution of an item of software, in which the model identifies that an attacker has various capabilities as described in more detail below (i.e. the attacker can carry out certain actions/operations and has access to certain data). Therefore, if an attacker would have those capabilities when the item of software is actually being executed in a particular execution environment (e.g. using a particular computer/processor etc.) then one may say that the item of software is executing in a "white-box" environment. In the white-box attack environment, the attacker of the item of software is assumed to have full access to, and visibility of, the data being operated on (including intermediate values), memory contents and execution/process/control flow of the item of software. Moreover, in the white-box attack environment, the attacker is assumed to be able to modify the data being operated on, the memory contents and the execution/process/control flow of the item of software, for example by using a debugger—in this way, the attacker can experiment on, and try to manipulate the operation of, the item of software, with the aim of circumventing initially intended functionality and/or identifying secret information and/or for other purposes.

However, the item of software may need to use or store or generate secret information (e.g. one or more cryptographic keys or identifiers), where this information needs to remain hidden from, or unusable/inaccessible by, the attacker (except as part of the correct/intended functionality of the item of software); the item of software may need to execute different portions of code based on particular decision logic, where it is important to ensure that an attacker cannot force the software to execute one portion of code instead of another portion of code in contradiction to the decision logic; etc. The set-up, configuration and capabilities of the computer system 210 are not necessarily known (or fully known) to, and/or are not controllable (or fully controllable) by, the provider of the item of software, and so it can be assumed that the item of software may end up being executed in a white-box attack environment. This is particularly relevant when the item of software is written in a scripted or interpreted language, such as JavaScript, due to the human-readable nature of scripted or interpreted languages (as opposed to, say, compiled binary executable files)—the user of the computer system 210 can view, monitor and modify execution of such items of software (e.g. during interpretation or after just-in-time compilation), which makes it easy for an attacker to copy and modify the item of software and/or its data or control flow in an attempt to launch an attack against/using the item of software. This is why, instead of executing the initial item of software 250 on the computer system 210, the initial item of software 250 has one or more software protection techniques applied to it by the protection system 220, resulting in the protected item of software 240. It is this protected item of software 240 which is executed on the computer system 210. The protection techniques applied in order to generate the protected item of software 240 aim to make it difficult for an attacker to carry out a successful attack on the protected item of software 240, and/or aim to reduce/mitigate the consequences of such an attack by an attacker—i.e. the protection techniques aim to secure the initial item of software 250 against the white-box attack environment.

The protection system 220 comprises, or is arranged to execute, a protection application 222. In summary, the protection application 222 receives the initial item of software 250 and applies one or more "protections" to the item of software 250 to thereby generate and output the protected item of software 240. Thus, the protection application 222 comprises one or more protector modules or components 224 that is/are arranged to apply one or more "protections" to the initial item of software 250, or to a version of the item of software 250 that has already had one or more of these protections applied by one or more of the protector modules 224 (as shall be described in more detail later).

The enforcement system 230 comprises, or is arranged to execute, an integrity enforcement application 232. In summary, during execution or runtime of the protected item of software 240, the execution of the protected item of software 240 may be dependent on enforcement data (or an enforcement value/data, or an enforcement result) received from the integrity enforcement application 232 via the network 270. The integrity enforcement application 232 may generate the enforcement data in dependence on behaviour of the protected item of software 240 during execution (such as observed or received data from the protected item of software 240). In some embodiments, during execution or runtime of the protected item of software 240, the protected item of software 240 receives (or acquires or otherwise obtains) fix-up data (the nature of which will be described shortly) from the integrity checking application 232 via the network 270. The integrity checking application 232 may provide the fix-up data contingent (or in requirement of) the protected item of software satisfying one or more integrity verification checks.

The initial item of software 250 and the protected item of software 240 may each comprise one or more computer programs (or software or modules) that may be stored as one or more files. Each file can contain or implement one or more functions. The initial item of software 250 and the protected item of software 240 may each be, or implement, one or more entire software applications, or one or more components for a software application (e.g. a library file), or a smaller component (e.g. a code snippet). The initial item of software 250 may comprise source code written in one or more languages, one or more of which may be the same as the language(s) for the protected item of software 240, although this is not necessary. The initial item of software 250 and the protected item of software 240 may each comprise compiled/executable code and/or source code (or interpreted code). The initial item of software 250 and the protected item of software 240 may comprise compiled code for execution as (part of) a native application at the computer system 210. The initial item of software 250 and the protected item of software 240 may comprise code for execution within a virtual machine executing on the computer system 210. The initial item of software 250 and the protected item of software 240 may comprise code for execution within a browser executing on the computer system 210 (e.g. as a webapp or code of a webpage).

The term "code" as used herein in relation to an item of software refers to instructions/commands of the item of software. In addition to code, the item of software (e.g. the initial item of software 250 and the protected item of software 240) may comprise data and/or other resources, so that execution of the "code" (or execution of the item of software) comprises executing some or all of these instructions/commands, where this execution might potentially involve using some of the data and/or other resources if present in the item of software. The term "software element" as used herein in relation to an item of software refers to code and/or other components (e.g. data and/or other resources/assets) of the item of software. Thus, a software element of (or for) an item of software may comprises (a) one or more pieces of code (e.g. one or more instructions/commands) of (or for) the item of software, and/or (b) one or more pieces of data or other resources of (or for) the item of software, and/or (c) one or more code blocks (as described shortly below).

Figure 3:
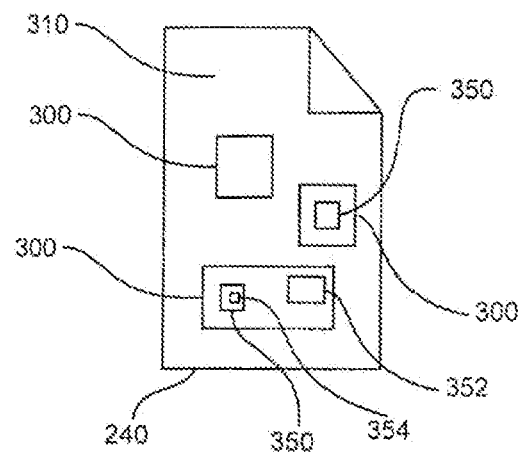
FIG. 3 schematically illustrates an example of a protected item of software 240 for use with the system of FIG. 2.

FIG. 3 schematically illustrates an example of the protected item of software 240 for use with the system 200 of FIG. 2. The initial item of software 250 comprises initial software elements. The protected item of software 240 may comprise some of the initial software elements 310 from the initial item of software 250 unchanged (although it will be appreciated that the protected item of software 240 may comprise no unchanged initial software elements 310 of the initial item of software 250). The protection application 222, in applying the one or more protections to the initial item of software 250, may modify one or more parts of the initial software elements from the initial item of software 250 and/or may introduce one or more additional software elements—these modified and/or introduced software elements shall be referred to herein as update software elements 300.

As mentioned above, the aim of the protector module(s) 224 is to protect (or secure) the functionality or data processing of the initial item of software 250 and/or to protect (or secure) data used or processed or generated or stored by the initial item of software 250. This can be achieved by applying a variety of software protection techniques (referred to herein as "protections"), such as one or more of cloaking techniques, homomorphic data transformation, control flow transformation, white-box cryptography, key hiding, program interlocking and boundary blending.

In particular, the protected item of software 240 (i.e. the initial item of software 250 after being processed by the protector module(s) 224) will provide at least the same functionality or data processing as the initial item of software 250. However, this functionality or data processing is typically implemented in the protected item of software 240 in a manner such that an operator of the computer system 210 executing the protected item of software 240 cannot (or at least finds it difficult to) access or use this functionality or data processing from the protected item of software 240 in an unintended or unauthorised manner, whereas if that computer system 210 were to execute the initial item of software 250 instead (i.e. in an unprotected form), then the operator of the computer system 210 might have been able to launch a successful attack and thereby access or use the functionality or data processing in an unintended or unauthorised manner. Similarly, the protected item of software 240 may, due to processing by the protector module(s) 224, generate or use or access or operate on/with secret information (such as a cryptographic key or an identifier) that is represented in an encoded (or protected/obfuscated) form, using protected or obfuscated operations—this makes it more difficult (if not impossible) for an attacker to deduce or access that secret information (whereas such information may have been deducible or accessible from the initial item of software 250 without the protections having been applied).

For example:

The initial item of software 250 may comprise a decision (or a decision block or a branch point) that is based, at least in part, on one or more items of data to be processed by the initial item of software 250. If the initial item of software 250 were executed in its unprotected form, then an attacker may be able to force the initial item of software 250 to execute so that a path of execution is followed after processing the decision even though that path of execution were not meant to have been followed. For example, the decision may comprise testing whether a program variable B is TRUE or FALSE, and the initial item of software 250 may be arranged so that, if the decision identifies that B is TRUE then execution path $P_T$ is followed/executed whereas if the decision identifies that B is FALSE then execution path $P_F$ is followed/executed. In this case, the attacker could (for example by using a debugger or by rewriting the initial item of software 250) force the initial item of software 250 to follow path $P_F$ if the decision identified that B is TRUE and/or force the initial item of software 250 to follow path $P_T$ if the decision identified that B is FALSE. Therefore, in some embodiments, one or more of the protector module(s) 224 aim to prevent (or at least make it more difficult) for the attacker to do this by applying one or more software protection techniques to the decision within the initial item of software 250.

The initial item of software 250 may comprise one or more of a security-related function; an access-control function; a cryptographic function; and a rights-management function; etc. Such functions often involve the use or generation of secret data, such as one or more cryptographic keys. The processing may involve using and/or operating on or with one or more cryptographic keys. If an attacker were able to identify or determine the secret data, then a security breach has occurred and control or management of data (such as audio and/or video content) that is protected by the secret data may be circumvented. Therefore, in some embodiments, one or more of the protector module(s) 224 aim to prevent (or at least make it more difficult) for the attacker to identify or determine the one or more pieces of secret data by applying one or more software protection techniques to such functions within the initial item of software 250. This may involve arranging the protected item of software 240 so that it represents secret data in an obfuscated manner within the protected item of software 240 itself. Additionally or alternatively, this may involve arranging the protected item of software 240 with functionality to be able to dynamically read and write secret data in an obfuscated or encrypted form to/from a memory.

The protected item of software 240 may comprise additional functionality (i.e. functionality not originally in the initial item of software 250). This additional functionality may be included into the initial item of software 250 to help form the protected item of software 240 by the protector module(s) 224.

There are numerous techniques, referred to herein as "white-box obfuscation techniques", for transforming the initial item of software 250 so that it is resistant to white-box attacks (i.e. attacks that could be launched, or are available, under the white-box attack environment). Examples of such white-box obfuscation techniques can be found, in "*White-Box Cryptography and an AES Implementation*", S. Chow et al, Selected Areas in Cryptography, 9$^{th}$ Annual International Workshop, SAC 2002, Lecture Notes in Computer Science 2595 (2003), p250-270 and "*A White-box DES Implementation for DRM Applications*", S. Chow et al, Digital Rights Management, ACM CCS-9 Workshop, DRM 2002, Lecture Notes in Computer Science 2696 (2003), p1-15, the entire disclosures of which are incorporated herein by reference. Additional examples can be found in U.S. 61/055,694 and WO2009/140774, the entire disclosures of which are incorporated herein by reference. Some white-box obfuscation techniques (such as those described above and others set out below) enable storage and/or use, and possibly manipulation of, secret/sensitive data (such as cryptographic keys) in a transformed/secured manner from which it is difficult/impossible for an attacker to access or derive the underlying secret/sensitive data. Some white-box obfuscation techniques implement data flow obfuscation—see, for example, U.S. Pat. No. 7,350,085, U.S. Pat. No. 7,397,916, U.S. Pat. No. 6,594,761 and U.S. Pat. No. 6,842,862, the entire disclosures of which are incorporated herein by reference. Some white-box obfuscation techniques implement control flow obfuscation—see, for example, U.S. Pat. No. 6,779,114, U.S. Pat. No. 6,594,761 and U.S. Pat. No. 6,842,862 the entire disclosures of which are incorporated herein by reference. However, it will be appreciated that other white-box obfuscation techniques exist and that embodiments of the invention may use any white-box obfuscation techniques.

As another example, it is possible that the initial item of software 250 may be intended to be provided (or distributed) to, and used by, a particular computer system 210 (or a particular set of computer systems 210) and that it is, therefore, desirable to "lock" the initial item of software 250 to the particular computer system(s) 210, i.e. to prevent the initial item of software 250 (once protected) from executing on another computer system 210. Consequently, there are numerous techniques, referred to as "node-locking" protection techniques, for transforming the initial item of software 250 so that the protected item of software 240 can execute on (or be executed by) one or more predetermined/specific computer systems 210 but will not execute on other computer systems 210. Examples of such node-locking techniques can be found in WO2012/126077, the entire disclosure of which is incorporated herein by reference. However, it will be appreciated that other node-locking techniques exist and that embodiments of the invention may use any node-locking techniques.

Digital watermarking is a well-known technology. In particular, digital watermarking involves modifying an initial digital object to produce a watermarked digital object. The modifications are made so as to embed or hide particular data (referred to as payload data) into the initial digital object. The payload data may, for example, comprise data identifying ownership rights or other rights information for the digital object. The payload data may identify the (intended) recipient of the watermarked digital object, in which case the payload data is referred to as a digital fingerprint—such digital watermarking can be used to help trace the origin of unauthorised copies of the digital object. Digital watermarking can be applied to items of software. Examples of such software watermarking techniques can be found in U.S. Pat. No. 7,395,433, the entire disclosure of which is incorporated herein by reference. However, it will be appreciated that other software watermarking techniques exist and that embodiments of the invention may use any software watermarking techniques.

It may be desirable to provide different versions or instances of the initial item of software 250 to different computer systems 210 (or different users of computer systems 210). The different versions of the initial item of software 250 provide the same functionality—however, the different versions of the initial item of software 250 are programmed or implemented differently. This may help limit the impact of an attacker successfully attacking the protected item of software 240. In particular, if an attacker successfully attacks his version of the protected item of software 240, then that attack (or data, such as cryptographic keys, discovered or accessed by that attack) may not be suitable for use with different versions of the protected item of software 240. Similarly, having different protected instances 240 of the initial item of software 250 helps identify specific users (e.g. specific computer systems 210) of the protected item of software 240. Consequently, there are numerous techniques, referred to herein as "diversity" techniques, for transforming the initial item of software 250 so that different protected versions of the initial item of software 250 are generated (i.e. so that "diversity" is introduced). Examples of such diversity techniques can be found in WO2011/120123, the entire disclosure of which is incorporated herein by reference. However, it will be appreciated that other diversity techniques exist and that embodiments of the invention may use any diversity techniques.

The above-mentioned white-box obfuscation techniques, node-locking techniques, software watermarking techniques and diversity techniques are examples of software protection techniques. It will be appreciated that there are other methods of applying protection to the initial item of software 250. Thus, the term "software protection techniques", or "protections" as used herein shall be taken to mean any method of applying protection to the initial item of software 250 (with the aim of thwarting attacks by an attacker, or at least making it more difficult for an attacker to be successful with his attacks), such as any one or more of the above-mentioned white-box obfuscation techniques (which aim to secure against a white-box attack environment) and/or any one or more of the above-mentioned node-locking techniques and/or any one or more of the above-mentioned software watermarking techniques and/or any one or more of the above-mentioned diversity techniques and/or any one of the protection techniques described shortly below. The protector module(s) 224 may, therefore, be arranged to apply any one or more of the above-mentioned software protection techniques or protections to the initial item of software 250 to generate the protected item of software 240—this may involve a first protector module 224 applying a software protection technique to some or all of the initial item of software 250, and then possibly one or more protector modules 224 applying a software protection technique to some or all of the output of a preceding protector module 224 (e.g. sequential application/layering of protections). The resultant protected item of software 240 may, therefore, be referred to as "protected software".

There are numerous ways in which the protector module(s) 224 may implement the above-mentioned software protection techniques within the initial item of software 250. For example, to protect the initial item of software 250, the protector module(s) 224 may modify one or more software elements within the initial item of software 250 and/or may add or introduce one or more new software elements into the initial item of software 250. The actual way in which these modifications are made or the actual way in which the new software elements are written can, of course, vary—there are, after all, an infinite number of ways of writing software to achieve the same functionality.

Numerous examples and methods for implementing the protector module(s) 224 so as to generate protected the item of software 240 from the initial item of software 250 can be found, for example, in WO2015/150391 and WO2015/150376, the entire disclosures of which are incorporated herein by reference. Further examples of protection techniques that the protector module(s) 224 may be arranged to apply can be found in WO2013/142981, WO2013/142979, WO2013/142983 and WO2013/142980, the entire disclosures of which are incorporated herein by reference.

The protection system 220 may comprise or implement a library database/store (not shown in FIG. 2). The library database may comprise one or more pre-generated protected software modules (or functions or procedures or software snippets), and potentially multiple differently implemented/protected instances for the same underlying functionality/software. These modules are "pre-generated" insofar as they are generated independently of, and potentially prior to receipt of, the initial item of software 250. This library database may, therefore, be viewed as a repository available to the protection application 222, so that the protection application 222 (or one or more of the protector modules or components 224) can use, or include within the protected item of software 240, one or more of the modules stored within the library database. To this end, the protection system 220 may be arranged to execute a library application that generates the software modules stored in the library database. An example of such a library application to generate protected modules is described in WO2015/150376, the entire disclosure of which is incorporated herein by reference. The protection application 222 may be arranged to obtain software modules directly from the library database or may be arranged to obtain software modules from the library database via the library application. It will be appreciated that the library application may be part of, and may be executed by, an entity other than the protection system 220. Similarly, it will be appreciated that the library database may be part of, and may be provided by, an entity other than the protection system 220.

Figure 4:
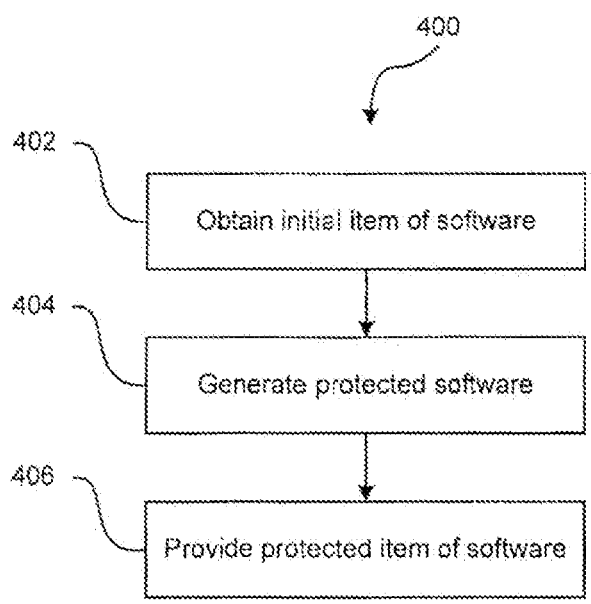
FIG. 4 is a flowchart illustrating an example method of operating a protection system according to some embodiments of the invention.

FIG. 4 is a flowchart illustrating an example method 400 of operating the protection system 220 according to some embodiments of the invention.

At a step 402, the protection system 220 obtains the initial item of software 250. This may comprise the protection system 220 receiving the initial item of software 250 from a different entity. Alternatively, this may comprise the protection system 220 generating the initial item of software 250 (e.g. if the protection system 220 is being operated by an entity that generates/writes and protects its own software).

At a step 404, the protection system 220 uses the protection application 222 to generate, from the obtained initial item of software 250, the protected item of software 240. This may include: (a) including one or more modules or software elements (e.g. software elements from the library database) into the initial item of software 250 and/or (b) applying one or more of the above-mentioned software protection techniques. As mentioned, this may involve generating multiple different protected instances or versions of the initial item of software 250.

At a step 406, the protection system 220 may output the protected item of software 240. The protected item of software 240 may be stored in a database of items of software for later access—the database may be hosted by the protection system 220 or by a different entity. The protected item of software 240 may be provided to the supplier of the initial item of software 250 (e.g. in a model whereby the protection system 220 provides a protection service to external software developers). The protected item of software 240 may be provided to the computer system 210 via the network 270 (e.g. in a model whereby the protection system 220 receives a request from the computer system 210 for an item of software and provides the protected item of software 240 to the computer system 210 in response to the request—the protection system 220 could generate the protected item of software 240 in response to the request or may use an already-generated protected item of software 240 as a response to the request).

Figure 5:
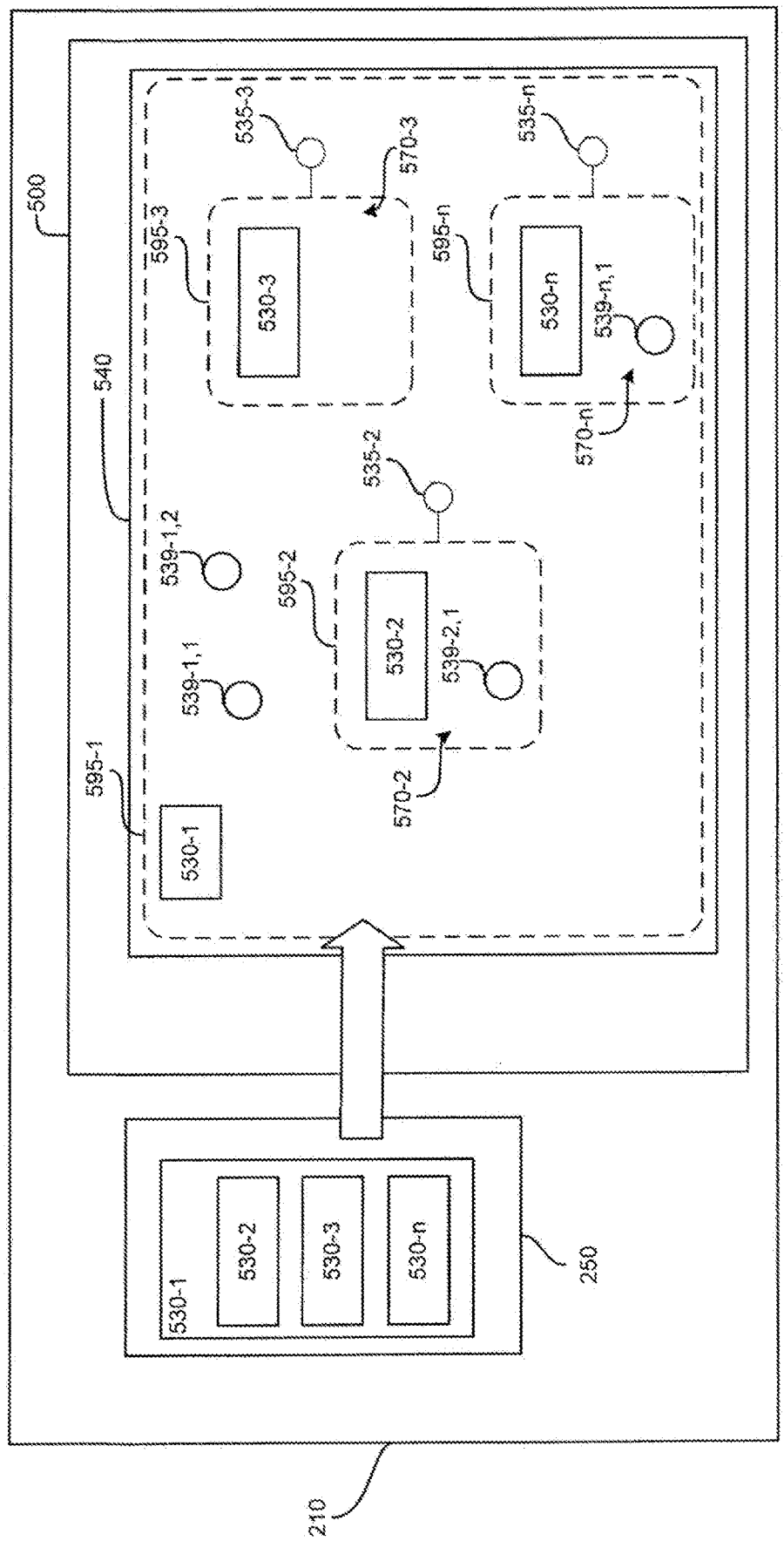
FIG. 5 schematically illustrates an example of an initial item of software executed on a system such as the system of FIG. 1.

FIG. 5 schematically illustrates an example of an initial item of software 250. In particular FIG. 5 shows the expected behaviour of the initial item of software were it to be executed (or run) on a system such as the computer system 100 without having any "protections", as set out above, applied.

System 210 comprises an execution environment 500. The execution environment 500 comprises (or has running/executing therein) a software instance 540 of the initial item of software 250. The execution environment 500 may comprise any one or more of: a virtual machine; an operating system; device drivers; runtime libraries; etc. If the initial item of software 250 is written in a scripted or interpreted language the execution environment 500 may comprise the corresponding interpreter. Examples of interpreted languages that may be used include (but are not limited to): LISP; JavaScript; Java; Ruby and so on. In this way it will be understood that the execution environment 500 may be any execution environment 500 suitable for running (or executing) the initial item of software 240.

The initial item of software 240 comprises one or more code blocks 530 (in FIG. 5n such blacks are shown as 530-1; 530-2; 530-3; . . . ; 530-n). For ease of discussion a single code block 530 will be described in detail below, but it will be appreciated that this discussion may apply to any of the code blocks 530-1; 530-2; 530-3; . . . ; 530-n.

The execution environment 500 is typically arranged to run (or execute) the initial item of software 240 as a software instance 540. The software instance 540 typically comprises (or has loaded or otherwise has available) the code blocks 530 of the initial item of software 240.

A code block 530 may be thought of as particular type (or subset of) of a software element described above. A code block 530 typically comprises one or more pieces of code (e.g. one or more instructions/commands) of (or for) the initial item of software 250. A code block 530 is typically arranged to be callable (or invocable or otherwise may be caused to be executed) by other code in the initial item of software 250. In other words, a code block 530 may be or comprise one or more software routines (or callable units). It will be understood that there are many types of routines known in the art including (but not limited to) subroutines, functions, procedures, methods, subprograms and so on. A software routine is usually arranged to, when executed, perform one or more tasks (or provide one or more elements of functionality). It will also be appreciated that a code block

530 may comprise (or define or otherwise cause to be instantiated) one or more further code blocks 530. FIG. 5 shows, as an example, the code block 530-1 comprising the other code blocks 530-2; 530-3; 530-*n*. One or more code blocks 530 in the software instance 540 may have respective corresponding stored references 535, described shortly below. FIG. 5 shows n such references as 535-1; 535-2; 535-3; . . . ; 535-*n*.

The software instance 340 may also comprise one or more variables 539 (FIG. 5 shows a number of such variables as 539-1,1; 539-1,2; 539-2,1; . . . ; 539-*n*,1 with the leading suffix indicating the suffix of the respective code block). A variable 539 may store data (such as one or more values, one or more objects, and so on). Typically, a variable 539 may be used (or accessed or otherwise read from and/or written to) by code in the initial item of software 250 (such as by one or more code blocks 530). Such use of a variable 539 will generally be in the course of the execution of the initial item of software 250. The use of variables 539 is widely known in the field of computer programming and is not described further herein. A variable 539 may be defined in (or instantiated or allocated or otherwise created by) a particular code block 530. It will be appreciated that a given code block 530 may define more than one variable 539.

The stored references 535 are usually stored as part of the software instance 540. Each stored reference 535 is arranged to enable the invocation (or execution) of the corresponding code block 530 by other instructions in the initial item of software 250 (such as by other code blocks 530). In other words, a code block 530 may be called using the respective stored reference 535. For example, a stored reference 535 may comprise a memory address of a particular code block 530-*a* (or of a routine of the particular code block 530-*a*). A further code block 530-*b* may call the particular code block 530-*a* (or routine) using the memory address. In particular, the further code block 530-*b* may instruct (or request or otherwise cause) the execution (usually controlled by the execution environment 500) to jump to the memory address, thereby causing the execution of the particular code block 530-*a* (or routine).

It will be appreciated that a stored reference 535 may be stored as a variable 539 described above. For example, where a stored reference 535 may comprise a memory address of a particular code block 530, the memory address may be stored as a pointer type variable 539 (referred to herein as simply a pointer).

The execution environment 500 of the software instance 540 may be such that a particular variable 539 is not accessible by instructions or code in all parts of the execution instance. Typically, a particular variable 539 may only be accessed by the corresponding code block 530 (or code therein). In addition, where the corresponding code block 530 defines one or more further code blocks 530 usually, the one or more further code blocks 530 (or code therein) may access the particular variable 539. For example, in FIG. 5 the code block 530-1 defines the variable 539-1,1 and the variable 539-1,2. The variable 539-1,1 and the variable 539-1,2 are accessible by the code block 530-1. The variable 539-1,1 and the variable 539-1,2 are also accessible by the further code blocks 530-2; 530-3; 530-*n* defined by the code block 530-1. The particular further code block 530-2 defines the further variable 539-2,1. The further variable 539-2,1 is accessible by the particular further code block 530-2,1. The further variable 539-2,1 is not accessible by the code block 530-1. The further variable 539-2,1 is not accessible by the other further code blocks 530-3; 530-*n*. The access to variables 539 is typically enforced by the execution envi-ronment. It will be appreciated that even when a variable 539-*b* is not accessible by a given code block 530-*a* the given code block 530-*a* may be able to invoke (or execute) a second code block 530-*b*, for which the variable 539-*b* is accessible, to access the variable 539-*b*. However, here the second code block 530-*b* effectively mediates (or limits) what effect (if any) the given code block 530-*a* can have on the variable 539-*b*, or even if the given code block 530-*a* can read the value of the variable 539-*b*.

As such, it will be appreciated that each code block 530 may be considered to have (or be associated with) a boundary 595 that logically encompasses said code block 530, variables 539 defined in said code block 530, and the boundaries 595-*a* of further code blocks 530-*a* within said code block 530. FIG. 5 shows n such boundaries as 595-1; 595-2; 595-3; . . . ; 595-*n* for the n respective codes blocks 530-1; 530-2; 530-3; . . . ; 530-*n*. Code of the software instance 540 outside of a boundary 595 cannot access a variable 539 inside of the boundary 595. Code blocks 530 that are inside of a boundary 595 are usually permitted by the execution environment 500 to access the variables 539- that are outside of the boundary 595. In this way it will be appreciated that a boundary 595 may be equivalent to the scope of a code block 530 as defined in some programming languages, such as JavaScript. It will be appreciated that there may be cases where a code block 530 within a particular boundary 595 may be prevented from accessing a given variable 539 that is outside of the particular boundary 595. For example, a variable of a code block 530 may have the same name as the given variable 539 which may prevent the code block 530 accessing the given variable 539.

It will be appreciated that in some cases one or more (or each) code block 530 in the software instance 540 may form part of a respective object 570. FIG. 5 shows a number of such boundaries as 595-2; 595-3; . . . ; 595-*n* for the respective codes blocks 530-2; 530-3; . . . ; 530-*n*. An object 570 may further comprise the variables 539 of (or defined in or instantiated or allocated or otherwise created by) the corresponding code block 530. The stored reference 535 for the code block 530 may be (or comprise) a stored reference for the object 570. In some cases, code of the software instance 540 outside of a boundary 595 of the code block 530 may access the variable (or variables) 539 of the code block 530 via the stored reference 535. It will be understood that an object 570 corresponding to a code block 530 may be understood to be a closure (or closure object) in some programming languages (such as JavaScript, ML, Lisp, Python)

In an example execution of the software instance 540 the code block 530-1 may start being executed by the execution environment 500. An instruction in the code block 530-1 may be reached which causes the further code block 530-2 to be invoked using the corresponding stored reference 535-2. The execution, as a result, may then jump to the further code block 530-2 and the execution of said further code block 530-2 may begin. An instruction in the further code block 530-2 may cause the addition of the variable 539-1,1 to the further variable 539-2,1, storing the result in the other variable 539-1,2. An instruction in the code block 530-1 may be reached which causes another further code block 530-3 to be invoked using the corresponding stored reference 535-2. The execution environment, as a result, may then jump to the further code block 530-3 and begin execution of said further code block 530-3. A worked example of an initial item of software for such an execution, written in JavaScript is listed here:

```
var foo;
var bar;
foo = 1;
bar = 1;
function add( )
{
  var baz;
  baz = 41;
  bar = foo + baz;
  return;
}
function subtract( )
{
  return bar - foo;
}
add( );
subtract( );
```

Here the entire listing is the code block 530-1; the function add ( ) (including the code between the braces) is the further code block 530-2; the function subtract ( ) (including the code between the braces) is the other further code block 530-3; foo is the variable 539-1,1; bar is the other variable 539-1,2; baz is the further variable 539-2,1; the stored references 535-2 is stored in the function object add the stored reference 535-3 is stored in the function object subtract.

Figure 6:
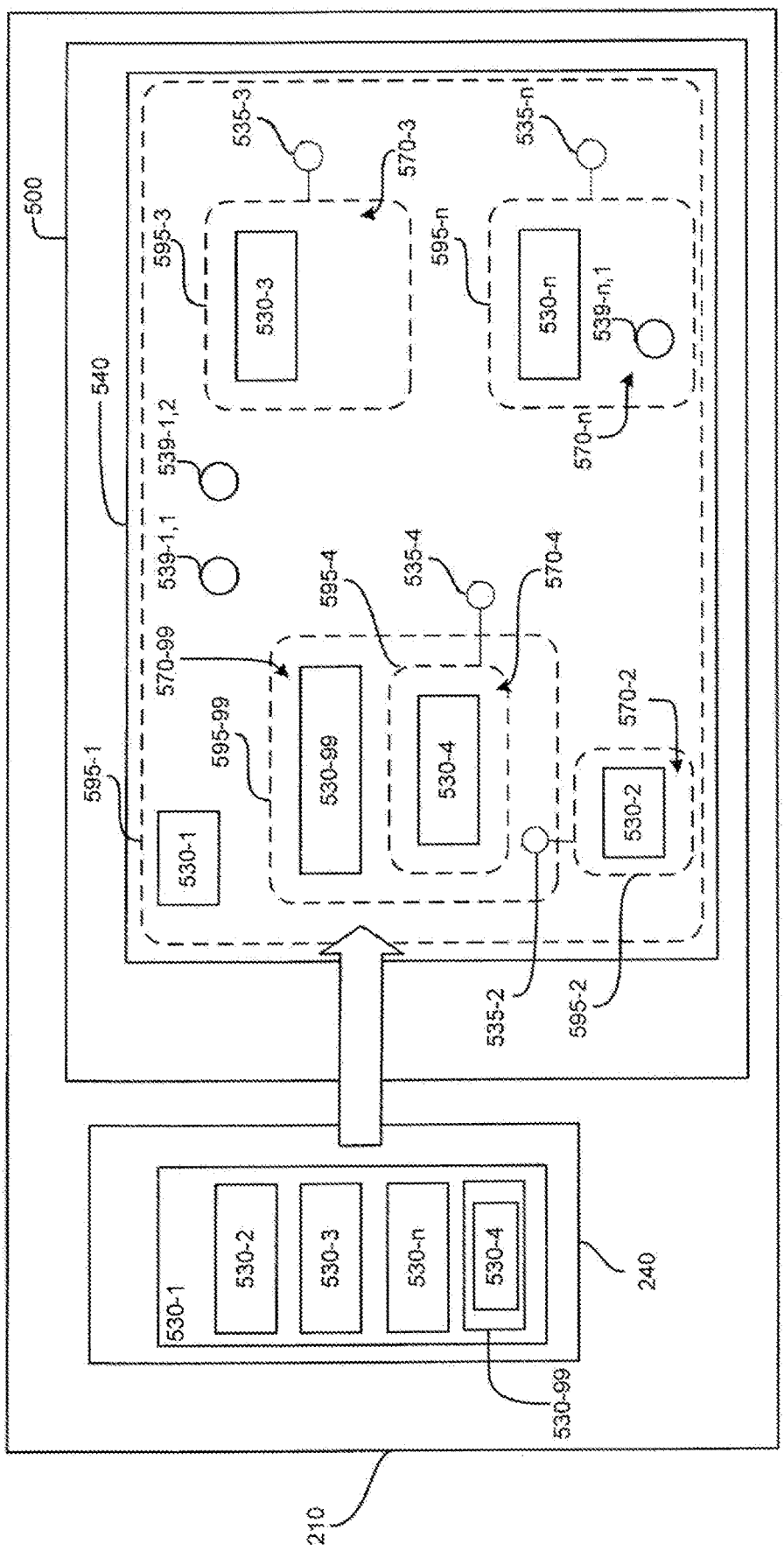
FIG. 6 schematically illustrates an example of a protected item of software executed on a system such as the system of FIG. 1.

FIG. 6 schematically illustrates an example of a protected item of software 240 executed (or run) on a system such as the system 210 of FIG. 2. The protected item of software 240 may be a protected item of software 240 corresponding to the initial item of software 250 described above with reference to FIG. 5 having been protected using a first protection method. Here like numerals indicate like elements and the description in relation to FIG. 5 applies equally to FIG. 6 except for in the following respects.

The code block 530-2 is a software routine 530-2 that has been the target of securing with the first protection method.

This software instance 540 further comprises a code block 530-4 (referred to as a wrapper code block 530-4). It will be appreciated that the discussion of a general code block 530 above applies to the wrapper code block 530-4. The software instance is arranged to store the reference 535-2 to the software routine 530-2 such that the stored reference 535-2 is inaccessible to code (or instructions) outside of the wrapper code block 530-4. In particular the reference 535-2 to the software routine 530-2 may be stored inside the boundary 595-4 of the wrapper code block 530-4 (typically such that no further boundary 595 separates the reference 535-2 to the software routine 530-1 and the wrapper code block 530-4). Where the wrapper code block 530-4 is part of an object 570-4 (such as a closure) the reference 535-1 to the software routine 530-2 may be stored as a private variable such as a variable 539 that forms part of the object 570-4. It will be understood that a private variable of an object 570-4 is a variable that cannot be accessed by code in the software instance 540 outside of the object 570-4. Furthermore, a private variable of an object 570 is a variable that cannot be accessed by code in the software instance 540 outside of the object 570 via the stored reference 535 of the object 570.

The wrapper code block 530-4 is arranged to, upon invocation of the wrapper code block 530-4, invoke the software routine 530-2 using the stored reference 535-2 to the software routine 530-2.

The wrapper code block 530-4 is typically arranged to determine whether the software routine 530-2 has been invoked by the wrapper code block 530-4 a predetermined number of times. The wrapper code block 530-4 may be arranged to store a counter variable for counting (or recording or otherwise tracking) the number of invocations of the software routine 530-2. It will be appreciated that typically the counter variable is stored such that the counter variable is inaccessible to code (or instructions) outside of the wrapper code block 530-4. Such storing of the counter variable may be achieved in the same way as the storing of the reference 535-2 to the software routine 530-2 discussed above.

Typically, the wrapper code block 530-4 is arranged to, after a predetermined number of invocations of the software routine 530-1 by the wrapper code block 530-4, modify the stored reference 535-2 to the software routine 530-2. It will be appreciated that such modification of the stored reference 535-2 to the software routine 530-2 may be any modification which prevents further invocation of the software routine 530-2 by the wrapper code block 530-4. For example, any of: setting the stored reference to a different value (such as a null value); deallocating (or freeing) the variable holding the stored reference; where the stored reference is stored using a pointer, modifying the memory address stored in a pointer; overwriting a function object of the stored reference; and so on. It will be appreciated however, that in a case where the software routine 530-2 may only be invoked by the wrapper code block 530-4 a single time no determination is needed. Here the wrapper code block 530-4 may be arranged to modify the stored reference 535-2 to the software routine 530-2 on every invocation of the wrapper code block 530-4.

It will be appreciated that the wrapper code block 530-4 may be arranged to pass any inputs (or arguments) (such as input or arguments provided directly to the software routine 530-4) to the software routine 530-2 upon invocation of the software routine 530-2. Similarly, the wrapper code block 530-4 may be arranged to pass any outputs (or returned values) from the software routine 530-2 as outputs (or returned values) of the wrapper code block 530-4 when the software routine returns (or terminates or otherwise completes).

The software instance 540 is arranged to invoke the wrapper code block 530-4 in order to invoke of the software routine 530-2. Typically, the software instance 540 is arranged to use the stored reference 530-4 to the wrapper code block 530-4 to invoke the software routine 530-2 when outside of the wrapper code block 530-4. As such it will be appreciated that some or all of the code in the initial item of software 250 which related to invocation of the software routine 530-2 may have been, in the protected item of software 240, aliased (or replaced or otherwise redirected) to code related to invocation of the wrapper code block 530-4. For example, one or more function calls to the software routine 530-2 may be replaced with function calls to the wrapper code block 530-4.

In this way it will be appreciated that a restriction is placed on the number of times a chosen software routine may be executed. An attacker, who can influence the call stack (or control flow or otherwise invoke code blocks of the instance) and wishes to run the software routine more that this pre-determined number, is faced with a dilemma. The attacker may try and invoke the software routine directly. However, as the attacker has no direct access to the reference 535-2 to the software routine 530-2 due to its storage as set out above, the attacker would be unable to invoke the software routine directly. The attacker may try and invoke the software routine using the wrapper code block. However, the wrapper code block, as set out above, limits the number of invocations of the software routine to a predetermined number. Additionally, as the software instance is invoking the software routine by invoking the wrapper code block the attacker may not even know of the existence of the software routine, let alone its purpose.

In some cases, the protected item software 240 comprises a further code block 530-99. In the software instance 540 the further code block 530-99 is typically executed at the same point in the code that it is defined. In other words, the further code block 530-99 is not callable as no reference to the further code block 530-99 is stored as part of the software instance. Such a further code block 530-99 is typically referred to as an anonymous function (or lambda function). Such a technique may be used for example if the protected item software 240 is in JavaScript, The further code block 530-99 may have (or be associated with) a boundary 595-99 that logically encompasses the code block 530-99, as described previously. Typically, once executed, the further code block forms part of an object 570-99 as described previously (such as a closure).

The further code block 530-99 may be arranged to define the wrapper code block 530-4. In this way the wrapper code block 530-4 is within the boundary 595-99 of the further code block 530-99 so can access the reference 535-2 to the software routine 530-2.

The software instance 540 is arranged to store the reference 535-4 to the wrapper code block 530-4 so that the reference 535-4 is not accessible to code outside of the further code block 530-99. In particular, the reference 535-2 to the software routine 530-2 may be stored inside the boundary 595-99 of the further code block 530-99 (typically such that no further boundary 595 separates the reference 535-2 to the software routine 530-1 and the further code block 530-99), as an alternative to storing the reference 535-2 inside the boundary 595-4 of the wrapper code block 530-4. Where the further code block 530-99 is part of an object 570-99 (such as a closure) the reference 535-1 to the software routine 530-2 may be stored as a private variable such as a variable 539 that forms part of the object 570-99. It will be appreciated that as there is no reference to the further code block 530-99 (or the corresponding object 570-99) code outside the further code block 530-99 cannot access the reference 535-2 to the software routine 530-2. As the wrapper code block 530-4 is inside the boundary 595-99 of the further code block 530-99 the reference 535-1 to the software routine 530-2 may still be accessed by the wrapper code block 530-4.

A worked example of such a protected item of software 240 for such an execution, written in JavaScript is listed here:

```
var foo;
var bar;
foo = 1;
bar = 1;
function add( )
{
    var baz;
    baz = 41;
    bar = foo + baz;
    return;
}
sec_add = function( ) {
    func=add
    return function( ) {
```

```
        var temp = func;
        func = null;
        return temp.apply(null, arguments);
    }
}( )
add = null;
function subtract( )
{
    return bar – foo;
}
sec_add( );
subtract( );
```

Here the entire listing is the code block 530-1; the function add ( ) (including the code between the braces) is the software routine 530-2. The anonymous function executed in the assignment to sec_add is the further code block 530-99; func is the stored reference 535-2; the function returned by the anonymous function is the code block 530-4 and sec_add is the stored reference to the code bock 530-4. For ease of understanding the software routine 530-2 add ( ) is a referenced function so the additional reference stored in add is nullified. However it will be appreciated that the software routine 530-2 add ( ) may be created without an explicit reference, such as an anonymous function.

Figure 7A:
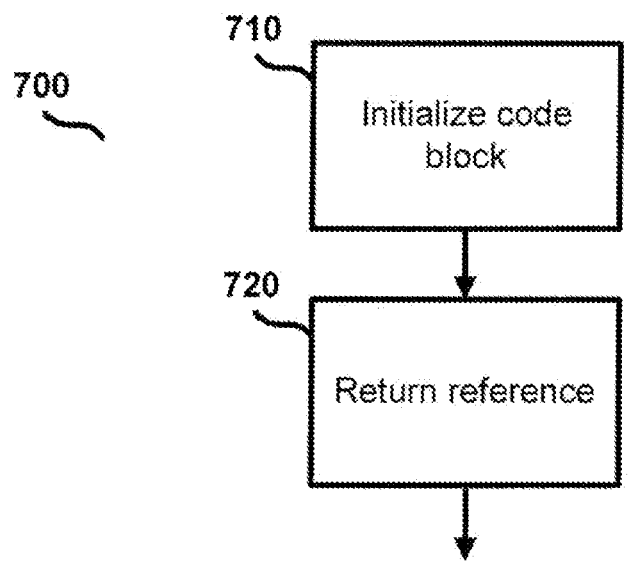
FIG. 7a is a flowchart illustrating an example method carried out when running a protected item of software such as the protected item of software in FIG. 6.

FIG. 7a shows an initialization method 700 for use by a protected item of software 240 during execution, such as the protected item of software 240 described in relation to FIG. 6 above. The method 700 typically involves securing a software routine 350-2 implemented in a software instance 540 executing in an execution environment 500. The method comprises the following steps.

A step 710 comprises initializing code block 530-4 (such as the wrapper code block discussed above) of the software instance 540 with a reference 535-2 to the software routine 530-2. Step 710 comprises storing the reference such that the stored reference is inaccessible to code of the software instance outside of the wrapper code block 530-4. Step 710 may comprise a further code block 530-99 (such as an anonymous function) storing the reference 535-2 to the software routine 530-2. In particular, the reference 535-2 may be stored as part of a closure object of the anonymous function.

A step 720 comprises returning a reference 535-4, where the reference 535-4 is to the wrapper code block 530-4. The step 720 may comprise returning the reference 535-4 to the wrapper code block 530-4 to the software instance 540. The step 720 may comprise the further code block 530-99 returning the reference 535-4. Typically, the reference 535-4 to the wrapper code block 530-4 is accessible to code of the software instance outside of the wrapper code block 530-4.

Figure 7B:
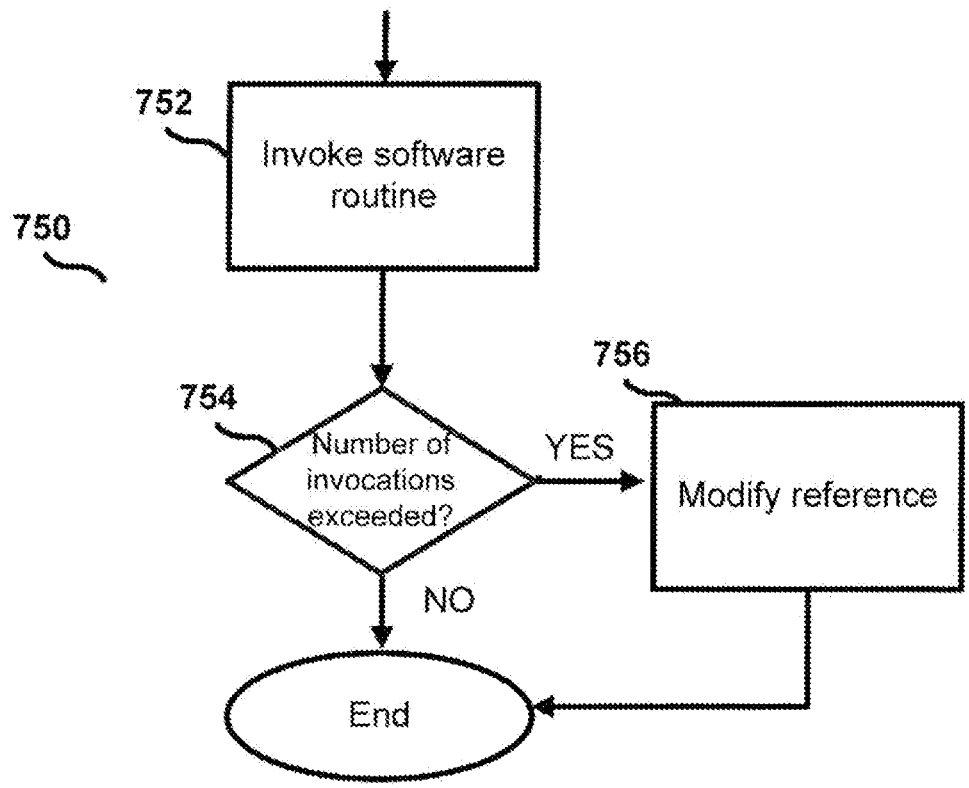
FIG. 7b is a flowchart illustrating an example method carried out when running a protected item of software such as the protected item of software in FIG. 6.

FIG. 7b shows a method 750 for use by a protected item of software 240 during execution, such as the protected item of software 240 described in relation to FIG. 6 above. The method 750 typically follows an initialization method, such as method 700. The method 750 may be thought of as executing a wrapper code block 530-4 of the software instance 540 and comprises the following steps.

A step 752 comprising invoking the software routine 530-2. The sub-step 752 comprises using the reference 535-2 to the software routine 530-2 for invoking the software routine 530-2.

A step 754 comprising determining that the software routine has been invoked by the code block a predetermined number of times. Typically, if, at the sub-step 754 it is determined that the software routine has been invoked by the code block a predetermined number of times, a step 756 is carried out.

The step 756 comprises modifying the stored reference 535-2 so as to prevent further invocation of the software routine 530-2, as described previously.

Figure 8:
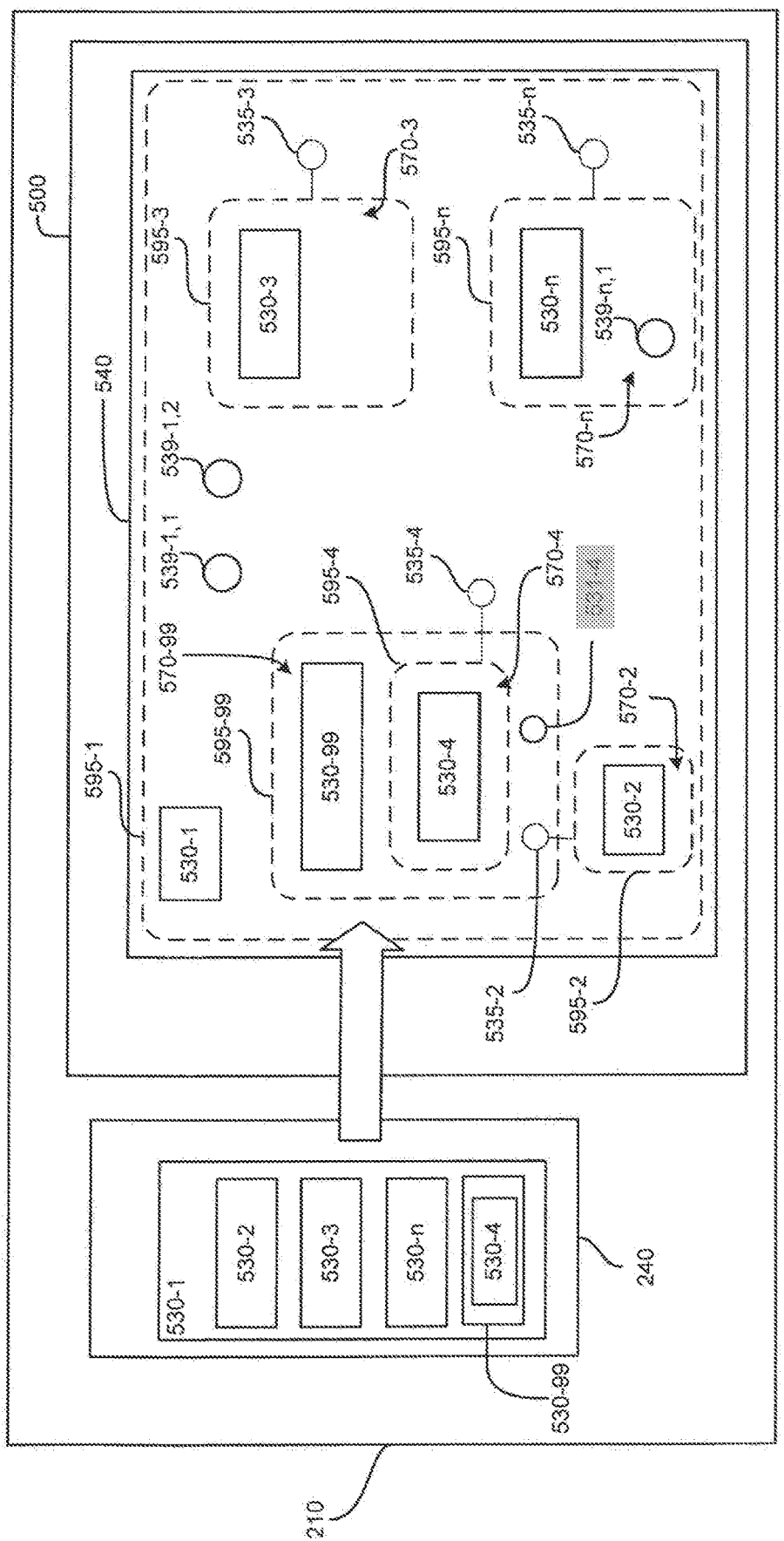
FIG. 8 schematically illustrates an example of a protected item of software executed on a system such as the system of FIG. 1.

FIG. 8 schematically illustrates an example of a protected item of software 240 executed (or run) on a system such as the system 210 of FIG. 2*a* or 2*b*. The protected item of software 240 may be a protected item of software 250 corresponding to the initial item of software 240 described above with reference to FIG. 5 having been protected using a second protection method. Here like numerals indicate like elements and the description in relation to FIGS. 5 and 6 applies equally to FIG. 7 except for in the following respects.

The code block 530-2 is a software routine 530-2 that has been the target of securing with the second protection method.

The software instance is arranged to store corruption data 531-4 such that the stored corruption data 531-4 is inaccessible to code (or instructions) outside of the wrapper code block 530-4. The corruption data 531-4 is typically stored as, or in a variable 539 as described previously. The corruption data 531-4 may be stored inside the boundary 595-4 of the wrapper code block 530-4 (typically such that no further boundary 595-*n* separates the reference 535-2 to the software routine 530-1 and the wrapper code block 530-4). Where the wrapper code block 530-4 is part of an object 570-4 (such as a closure) the corruption data 531-4 may be stored as a private variable 539 that forms part of the object 570-4.

The wrapper code block 530-4 is arranged to, upon invocation of the wrapper code block 530-4, invoke the software routine 530-2 using the stored reference 535-2 to the software routine 530-2. In particular, the wrapper code block 530-4 is arranged to apply the stored corruption data 531-4 (usually as part of the invocation of the software routine 530-2) to modify software routine data. The wrapper code block 530-4 is also arranged to update the stored corruption data 531-4 based on invocation of the software routine 530-2. The wrapper code block 530-4 may be arranged to update the stored corruption data 531-4 based on any one or more of: a number of invocations of the software routine 530-2; inputs (or arguments) for the software routine 530-2; outputs (or returned values) from the software routine 530-2 as outputs (or returned values); intermediate data (or values) calculated (or used) during the execution of the software routine 530-2; and so on.

It will be appreciated that software routine data typically refers to data used in the processing (or execution) of the software routine. Additionally, or alternatively software routine data may refer to data generated by the software routine. Software routine data may comprise any one or more of: inputs (or arguments) for the software routine 530-2; outputs (or returned values) from the software routine 530-2 as outputs (or returned values); intermediate data (or values) calculated (or used) during the execution of the software routine 530-2; and so on.

The software instance 540 is arranged to receive fix-up (or compensating) data corresponding to the stored corruption data. The software instance is arranged to apply the fix-up data to software routine data. The fix-up data is typically arranged to compensate for modification of the software routine data caused as a result of applying the corruption data. In some cases, the fix-up data may be applied to the same software data as the corruption data. The effect of applying the fix-up data and the corruption data to the software data together may be nothing. In other words, the fix-up data may logically or mathematically cancel the corruption data. In some cases, the fix-up data may be applied to different software data then the corruption data. In this case the fix-up data may cancel an effect of the corruption data on the software data. It will also be appreciated that the fix-up data may be applied before the corruption data is applied. In this case the corruption data may cancel an effect of the fix-up data on the software data. In some cases, the application of the fix-up data and the corruption data may cause an additional operation (or processing) to be carried out on the software data.

In this way it will be appreciated that in the absence of fix-up data (or if the fix-up data is not correct—i.e. the fix-up data does not compensate for the corruption data) the functionality of the software instance 540 is compromised. In particular, a result of the software routine may be incorrect, or not obtained.

The fix-up data is typically generated and/or provided by the integrity enforcement application 232 described previously. It will be appreciated that the integrity enforcement application 232 may generate the fix-up data based on knowledge of the state of the software instance 540. The integrity enforcement application 232 may generate the fix-up data based a predicted state of the software instance 540. For example, the integrity enforcement application 232 may have stored, or be able to simulate, the number of times a software routine is invoked for a given task. The integrity enforcement application 232 may have stored, or be able to simulate, a previous output, or chain of outputs, for a software routine for a given task etc. In this way it will be appreciated that a restriction is placed on execution of a software routine. An attacker, who can influence the call stack (or control flow or otherwise invoke code blocks of the instance) and wishes to run the software routine still needs to obtain appropriate fix-up data, or the software instance will not function correctly. Additionally, if the attacker simply invokes the software routine then synchronisation with the integrity enforcement application 232 may be lost. As a result, further fix-up data provided by the integrity enforcement application 232 may not correctly compensate for the (no updated) corruption data, due to the unexpected additional invocation of the software routine.

Additionally, or alternatively, it will be appreciated that one or more different software routines 530-2 of the software instance 540 may generate and/or provide the fix-up data. This may be generated based on a previous execution of the different software routine. This may be done based on an expected sequence of calls to the software routine 530-2 and the one or more different software routines 530-2. As such, if the software routine 530-2 is called out of the expected sequence (i.e. if the call graph is disrupted) the generated fix-up will not match the corruption data and the software instance will not function correctly.

In some cases, such as when the protected item software 240 is written in JavaScript, the protected item software 240 comprises a further code block 530-99 as set out previously.

The software instance 540 is arranged to store the corruption data 531-4 to the wrapper code block 530-4 so that is not accessible to code outside of the further code block 530-99.

The corruption data 531-4 may be stored inside the boundary 595-99 of the further code block 530-99 (typically such that no further boundary 595 separates the corruption data 531-4 and the further code block 530-99), as an alternative to storing the corruption data 531-4 inside the boundary 595-4 of the wrapper code block 530-4. Where the further code block 530-99 is part of an object 570-99 (such as a closure) the corruption data 531-4 may be stored as a private variable such as a variable 539 that forms part of the object 570-99. It will be appreciated that as there is no reference to the further code block 530-99 (or the corresponding object 570-99) code outside the further code block 530-99 cannot access the corruption data 531-4. As the wrapper code block 530-4 is inside the boundary 595-99 of the further code block 530-99 the corruption data 531-4 may still be accessed by the wrapper code block 530-4.

A worked example of such a protected item of software for such an execution, written in JavaScript is listed here:

```
var foo;
var bar;
function add( )
{
  var baz;
  baz = 41;
  bar = foo + baz;
  return;
}
cor_add = function( ) {
    var corrupt=0
    var func=add
    return function(fix) {
      return corrupt = func( ) + corrupt − fix;
    }
}( )
add=null
function subtract( )
{
  return bar − foo;
}
cor_add(fixup);
subtract( );
```

Here the entire listing is the code block 530-1; the function add ( ) (including the code between the braces) is the software routine 530-2. The anonymous function executed in the assignment to cor_add is the further code block 595-99; func is the stored reference 535-2; the function returned by the anonymous function is the code block 530-4 and cor_add is the stored reference to the code bock 530-4. corrupt is the stored corruption data 531-4 and fixup is the fix-up data (the step of receiving the fix-up data is not shown).

FIG. 9a shows an initialization method 900 for use by a protected item of software 240 during execution, such as the protected item of software 240 described in relation to FIG. 8 above. The method 900 typically involves securing a software routine 350-2 implemented in a software instance 540 executing in an execution environment 500. The method comprises the following steps.

A step 910 comprises initializing a wrapper code block 530-4 of the software instance 540 with corruption data 531-4. Typically, step 910 comprises storing the corruption data 531-4 such that the stored corruption data 531-4 is inaccessible to code of the software instance outside of the wrapper code block 530-4. Step 910 may comprise a further code block 530-99 (such as an anonymous function) storing the corruption data 531-4. In particular, the corruption data 531-4 may be stored as part of a closure object of the anonymous function.

A step 920 comprises returning a reference 535-4, where the reference 535-4 is to the wrapper code block 530-4. The step 920 may comprise returning the reference 535-4 to the wrapper code block 530-4 to the software instance 540. The step 920 may comprise the further code block 530-99 returning the reference 535-4. Typically, the reference 535-4 to the wrapper code block 530-4 is accessible to code of the software instance outside of the wrapper code block 530-4.

FIG. 9b shows a method 950 for use by a protected item of software 240 during execution, such as the protected item of software 240 described in relation to FIG. 8 above. The method 950 typically follows an initialization method, such as method 900. The method 950 may be thought of as executing a wrapper code block 530-4 of the software instance 540 and comprises the following steps.

A step 952 comprises invoking the software routine 530-2. The step 952 comprises using the reference 535-2 to the software routine 530-2 for invoking the software routine 530-2. The step 952 comprises applying the stored corruption data 531-4 to modify software routine data, as described previously.

A step 954 comprises updating the stored corruption data 531-4 based on the invocation of the software routine.

A step 956 comprises receiving fix-up data from an integrity enforcement application 232.

A step 958 comprises obtaining a result for the software routine. The step 958 typically comprises applying the fix-up data to software routine data. It will be appreciated that the step 956 and the step 958 may occur concurrently (or partially concurrently) with some or all of the preceding steps 952; 954. For example, the fix-up data may be applied to the software routine data during or before application of the corruption data, as discussed previously.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. It will also be appreciated that suitable data processing devices may include embedded devices. Examples of such devices may include (but are not limited to) embedded processing systems in cars. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program", "software" or "item of software" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system, potentially with data and/or other resources. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of securing a software routine implemented in a software instance executing in an execution environment, the method comprising:
   initializing a code block of the software instance by storing corruption data such that the stored corruption data is inaccessible to code outside of the code block; and
   returning a reference to the code block, the reference to the code block used by the software instance outside of the code block to invoke the software routine,
   wherein the code block is configured to:
      (i) invoke the software routine, said invocation comprising applying the stored corruption data to modify software routine data, and
      (ii) update the stored corruption data based on the invocation of the software routine,
   wherein the software instance is configured to:
      receive fix-up data corresponding to the stored corruption data, and
      obtain a result for the software routine by applying the fix-up data to software routine data to thereby compensate for said modification.

2. The method of claim 1 wherein the step of initializing further comprises:
   storing a reference to the software routine such that the stored reference is inaccessible to code outside of the code block, and
   wherein the code block is configured to invoke the software routine using the stored reference.

3. A method of executing a software routine in a software instance executing in an execution environment, the method comprising:
   executing a code block of the software instance, said executing the code block of the software instance comprising the code block:
      (a) invoking the software routine, said invocation comprising applying stored corruption data to modify software routine data, wherein corruption data is stored as part of the initialization of the code block such that the stored corruption data is inaccessible to code outside of the code block, and
      (b) updating the stored corruption data based on the invocation of the software routine,
   receiving fix-up data corresponding to the stored corruption data; and
   obtaining a result for the software routine by applying the fix-up data to software routine data to thereby compensate for said modification.

4. The method of claim 3 wherein the step of invoking the software routine uses a reference to the software routine, wherein the reference is stored as part of the initialization of the code block such that the stored reference is inaccessible to code outside of the code block.

5. The method of claim 1 wherein software routine data comprises data used by the software routine and/or data generated by the software routine.

6. The method of claims 1 wherein applying the stored corruption data to modify data for the software routine comprises any one or more of:
   (a) applying the stored corruption data to one or more inputs of the software routine;
   (b) applying the stored corruption data to one or more outputs of the software routine; and
   (c) applying, as part of the software routine, the stored corruption data to intermediate data of the software routine.

7. The method of claims 1 wherein the step of obtaining the result of the software routine is part of said executing the code block.

8. The method of claim 1 wherein applying the fix-up data to data for the software routine comprises any one or more of:
   (a) applying the fix-up data to one or more inputs of the software routine;
   (b) applying the fix-up data to one or more outputs of the software routine; and
   (c) applying, as part of the software routine, the fix-up data to intermediate data of the software routine.

9. The method of claim 1 wherein the execution environment prevents access to the stored corruption data by code outside of the code block.

10. The method of claim 1 wherein the corruption data is stored by executing a further code block which, once executed, cannot be accessed by code outside the further code block, and wherein the code block is defined by the further code block.

11. The method of claim 10 wherein said further code block is an anonymous function.

12. The method of claim 10 wherein said stored corruption data forms part of a closure of the further code block.

13. The method of claim 12 wherein the execution environment implements a boundary as part of the closure, thereby preventing code outside the further code block from interrogating the closure.

14. The method of claim 1 wherein the execution environment comprises any of:
   (a) a JavaScript virtual machine and the software is implemented at least in part in JavaScript;
   (b) a Java virtual machine and the software is implemented at least in part in Java;
   (c) a LISP interpreter and the software is implemented at least in part in LISP; and
   (d) a Python interpreter and the software is implemented at least in part in Python.

15. A system comprising one or more processors and a memory coupled to the one or more processors which are configured to execute programmed instructions stored in the memory to carry out a method of securing a software routine implemented in a software instance executing in an execution environment, the method comprising:
 initializing a code block of the software instance by storing corruption data such that the stored corruption data is inaccessible to code outside of the code block; and
 returning a reference to the code block, the reference to the code block used by the software instance outside of the code block to invoke the software routine,
 wherein the code block is configured to:
  (i) invoke the software routine, said invocation comprising applying the stored corruption data to modify software routine data, and
  (ii) update the stored corruption data based on the invocation of the software routine,
 wherein the software instance is configured to:
  receive fix-up data corresponding to the stored corruption data, and
  obtain a result for the software routine by applying the fix-up data to software routine data to thereby compensate for said modification.

16. A system comprising one or more processors and a memory coupled to the one or more processors which are configured to execute programmed instructions stored in the memory to carry out a method of executing a software routine in a software instance executing in an execution environment, the method comprising:
 executing a code block of the software instance, said executing the code block of the software instance comprising the code block:
  (a) invoking the software routine, said invocation comprising applying stored corruption data to modify software routine data, wherein corruption data is stored as part of the initialization of the code block such that the stored corruption data is inaccessible to code outside of the code block, and
  (b) updating the stored corruption data based on the invocation of the software routine,
 receiving fix-up data corresponding to the stored corruption data; and
 obtaining a result for the software routine by applying the fix-up data to software routine data to thereby compensate for said modification.

17. A non-transitory computer readable medium storing a computer program which, when executed by one or more processors, causes the one or more processors to perform a method of securing a software routine implemented in a software instance executing in an execution environment, the method comprising:
 initializing a code block of the software instance by storing corruption data such that the stored corruption data is inaccessible to code outside of the code block; and
 returning a reference to the code block, the reference to the code block used by the software instance outside of the code block to invoke the software routine,
 wherein the code block is configured to:
  (i) invoke the software routine, said invocation comprising applying the stored corruption data to modify software routine data , and
  (ii) update the stored corruption data based on the invocation of the software routine,
 wherein the software instance is configured to:
  receive fix-up data corresponding to the stored corruption data, and
  obtain a result for the software routine by applying the fix-up data to software routine data to thereby compensate for said modification.

18. A non-transitory computer readable medium storing a computer program which, when executed by one or more processors, causes the one or more processors to perform a method of executing a software routine in a software instance executing in an execution environment, the method comprising:
 executing a code block of the software instance, said executing the code block of the software instance comprising the code block:
  (a) invoking the software routine, said invocation comprising applying stored corruption data to modify software routine data, wherein corruption data is stored as part of the initialization of the code block such that the stored corruption data is inaccessible to code outside of the code block, and
  (b) updating the stored corruption data based on the invocation of the software routine,
 receiving fix-up data corresponding to the stored corruption data; and
 obtaining a result for the software routine by applying the fix-up data to software routine data to thereby compensate for said modification.

* * * * *